US012669156B2

(12) United States Patent
Wang et al.

(10) Patent No.: US 12,669,156 B2
(45) Date of Patent: Jun. 30, 2026

(54) LIGHTWEIGHT BRAKE DISC WITH MAXIMIZED HEAT DISSIPATION PERFORMANCE AND MANUFACTURING METHOD THEREOF

(71) Applicant: PUKYONG NATIONAL UNIVERSITY INDUSTRY-UNIVERSITY COOPERATION FOUNDATION, Busan (KR)

(72) Inventors: Jei Pil Wang, Busan (KR); Kwon Hoo Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 452 days.

(21) Appl. No.: 18/360,163

(22) Filed: Jul. 27, 2023

(65) Prior Publication Data
US 2024/0035531 A1 Feb. 1, 2024

(30) Foreign Application Priority Data
Jul. 27, 2022 (KR) ........................ 10-2022-0093136

(51) Int. Cl.
*F16D 65/12* (2006.01)
*C21D 1/74* (2006.01)
(Continued)

(52) U.S. Cl.
CPC ............. *F16D 65/128* (2013.01); *C21D 1/74* (2013.01); *C21D 9/0068* (2013.01); *C22C 33/06* (2013.01);
(Continued)

(58) Field of Classification Search
CPC ................. F16D 65/125; F16D 65/128; F16D 2200/0013; F16D 2200/0083;
(Continued)

(56) References Cited

U.S. PATENT DOCUMENTS

2002/0142146 A1* 10/2002 Gadow ................. F16D 69/023
428/292.1
2016/0025167 A1* 1/2016 Broda ....................... C23C 4/18
427/292

(Continued)

FOREIGN PATENT DOCUMENTS

KR 101240970 3/2013
KR 20200071341 6/2020

OTHER PUBLICATIONS

Goldbeck, Ortrud K. "Iron-Chromium." *Iron-Binary Phase Diagrams*, Springer, pp. 31-32.

*Primary Examiner* — Robert A. Siconolfi
*Assistant Examiner* — San M Aung
(74) *Attorney, Agent, or Firm* — NORTON ROSE FULBRIGHT US LLP

(57) ABSTRACT

Disclosed is a method for manufacturing a lightweight brake disc with maximized heat dissipation ability. The method includes a first step of mixing gray cast iron and Fe—Cr ferroalloy with each other to produce a mixture, melting and solidifying the mixture to cast an alloy; a second step of heat-treating the alloy cast in the first step to pearlitize a microstructure of the alloy; and a third step of performing nitriding heat treatment of the alloy heat-treated in the second step.

9 Claims, 3 Drawing Sheets

Mixing gray cast iron and Fe-Cr ferroalloy with each other to produce a mixture, melting and solidifying the mixture to cast an alloy    S 110

Normalizing heat-treatment    S 120

Nitriding heat treatment    S 130

(51) Int. Cl.

| | |
|---|---|
| *C21D 9/00* | (2006.01) |
| *C22C 33/06* | (2006.01) |
| *C22C 35/00* | (2006.01) |
| *C22C 37/10* | (2006.01) |
| *C22C 38/18* | (2006.01) |

(52) U.S. Cl.
CPC ............ *C22C 35/005* (2013.01); *C22C 37/10* (2013.01); *C22C 38/18* (2013.01); *F16D 65/125* (2013.01); *C21D 2211/009* (2013.01); *F16D 2200/0013* (2013.01); *F16D 2200/0082* (2013.01); *F16D 2250/0007* (2013.01); *F16D 2250/0053* (2013.01)

(58) Field of Classification Search
CPC ..... F16D 2250/0007; F16D 2250/0053; C21D 1/74; C21D 9/0068; C22C 33/06; C22C 35/005; C22C 37/10
USPC ..................................................... 188/218 XL
See application file for complete search history.

(56) References Cited

U.S. PATENT DOCUMENTS

| | | | | |
|---|---|---|---|---|
| 2017/0016497 A1* | 1/2017 | Haug | ...................... | C22C 38/18 |
| 2018/0031061 A1* | 2/2018 | Oi | ........................ | F16D 65/127 |
| 2020/0399724 A1* | 12/2020 | Ott | .......................... | C21C 1/105 |
| 2020/0407830 A1* | 12/2020 | Mohanty | ................ | C23C 24/04 |
| 2021/0293292 A1* | 9/2021 | Rettig | ................... | F16D 65/125 |

* cited by examiner

Mixing gray cast iron and Fe-Cr ferroalloy with each other to produce a mixture, melting and solidifying the mixture to cast an alloy          S 110

Normalizing heat-treatment          S 120

Nitriding heat treatment          S 130

LIGHTWEIGHT BRAKE DISC WITH MAXIMIZED HEAT DISSIPATION PERFORMANCE AND MANUFACTURING METHOD THEREOF

CROSS-REFERENCE TO RELATED APPLICATION

This application claims priority from Korean Patent Application No. 10-2022-0093136 filed on Jul. 27, 2022 in the Korean Intellectual Property Office, and all the benefits accruing therefrom under 35 U.S.C. 119, the contents of which in its entirety are herein incorporated by reference.

BACKGROUND

Field

The present disclosure relates to a method for manufacturing a lightweight brake disc having maximized heat dissipation ability, and more specifically, to a method for improving a surface hardness of a brake disc via nitriding heat treatment.

Description of Related Art

A pad is attached to a rotating brake disc to generate a braking force. A gray cast iron is mainly used as a material of the brake disc. Casting is traditionally used as a manufacturing method of the brake disc. After the casting, both side surfaces are machined. Then, the brake disc is commercialized. In this regard, when the machinability of the disc is not good, the surface roughness of the product becomes increased, such that the operability of the brake is lowed, resulting in poor operability.

When the gray cast iron is used, carbide is produced at a boundary of a eutectic cell constituting a microstructure, and thus greatly reduce the machinability. Therefore, a solution to this problem is required.

SUMMARY

One purpose of the present disclosure is to provide a manufacturing method of a lightweight brake disc with maximized heat dissipation ability.

Another purpose of the present disclosure is to provide a lightweight brake disc with maximized heat dissipation ability.

Purposes of the present disclosure are not limited to the above-mentioned purpose. Other purposes and advantages of the present disclosure that are not mentioned may be understood based on following descriptions, and may be more clearly understood based on embodiments of the present disclosure. Further, it will be easily understood that the purposes and advantages of the present disclosure may be realized using means shown in the claims and combinations thereof.

A first aspect of the present disclosure provides a method for manufacturing a lightweight brake disc having maximized heat dissipation ability, the method comprising: a first step of mixing gray cast iron and Fe—Cr ferroalloy with each other to produce a mixture, melting and solidifying the mixture to cast an alloy; a second step of heat-treating the alloy cast in the first step to pearlitize a microstructure of the alloy; and a third step of performing nitriding heat treatment of the alloy heat-treated in the second step.

In one implementation, the first step is performed: at a reaction temperature of 1,500° C. or higher, under an inert atmosphere as a reaction atmosphere, and for a reaction time of 30 minutes or larger.

In one implementation, the gray cast iron is composed of Fe (iron), C (carbon), Si (silicon), Mn (manganese), S (sulfur) and P (phosphorus).

In one implementation, carbon is present in a form of fine flake graphite in a base material of the gray cast iron.

In one implementation, in the Fe—Cr ferroalloy, a content of Cr is at least 60%.

In one implementation, the second step is performed: at a reaction temperature of 900° C. or higher, under an inert atmosphere as a reaction atmosphere, and for a reaction time of 8 hours or larger.

In one implementation, the third step is performed: at a reaction temperature of 500° C. or higher, and for a reaction time of 8 hours or larger.

In one implementation, the third step is performed under an atmosphere in which $N_2$ (nitrogen), $NH_3$ (ammonia) and $CO_2$ (carbon dioxide) are mixed with each other as a reaction atmosphere. In one implementation, a flow rate of the reaction atmosphere in the third step is controlled such that $N_2$ (nitrogen) is 1.5 $m^3$/h, $NH_3$ (ammonia) is 15 $m^3$/h, and $CO_2$ (carbon dioxide) is 0.3 $m^3$/h.

A second aspect of the present disclosure provides a lightweight brake disc having maximized heat dissipation ability, wherein the brake disc is manufactured by the method as described above, wherein a tensile strength of the brake disc is in a range of 250 to 280 MPa, and a surface hardness of the brake disc is in a range of 240 to 260 HMW.

In the brake disc manufacturing method of the present disclosure, the nitriding heat treatment may be included as a last step thereof to improve the surface hardness and the tensile strength, and to allow the method to be eco-friendly. Thus, the method may establishes core equipment-related design/analysis technology, material selection technology, and machining technology in the field of lightweight automotive materials as a future leading and high value-added market, and may build a brake disc rotor mass production system with stability and reliability.

Effects of the present disclosure are not limited to the above-mentioned effects, and other effects as not mentioned will be clearly understood by those skilled in the art from following descriptions.

DETAILED DESCRIPTIONS

Figure 1:
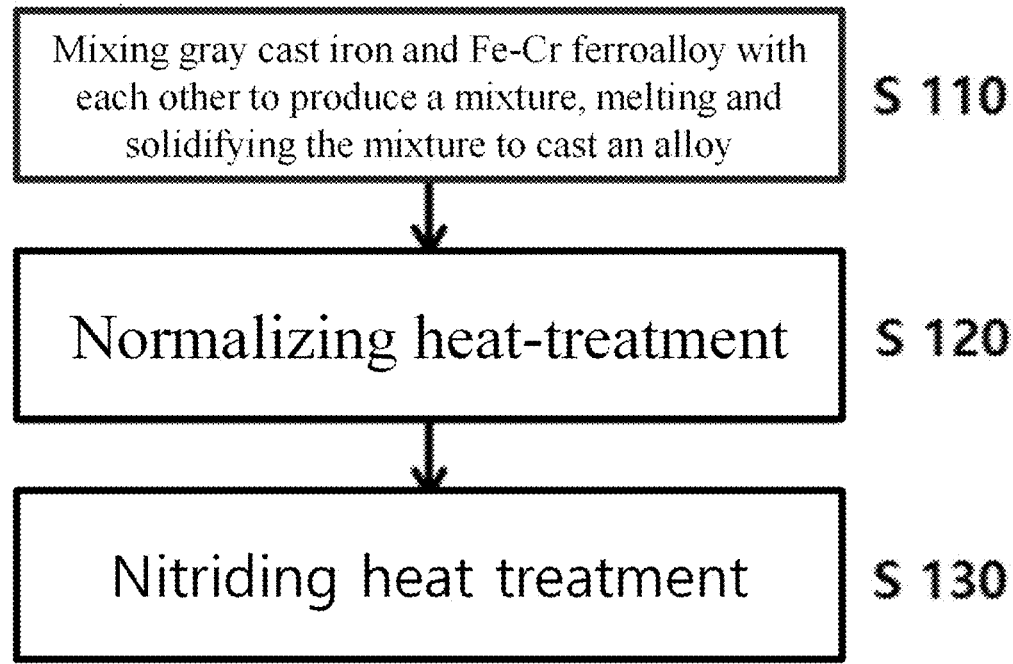
FIG. 1 is a flow chart showing a method for manufacturing a lightweight brake disc having maximized heat dissipation ability according to the present disclosure.

Advantages and features of the present disclosure, and a method of achieving the advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for describing embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for describing embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

The present disclosure provides a manufacturing method of a lightweight brake disc having maximized heat dissipation ability via Cr (chrome) and heat treatment on a brake disc made of gray cast iron as a base material thereof.

Hereinafter, the present disclosure will be additionally described along with specific embodiments.

Method for Manufacturing Brake Disc

Figure 2:
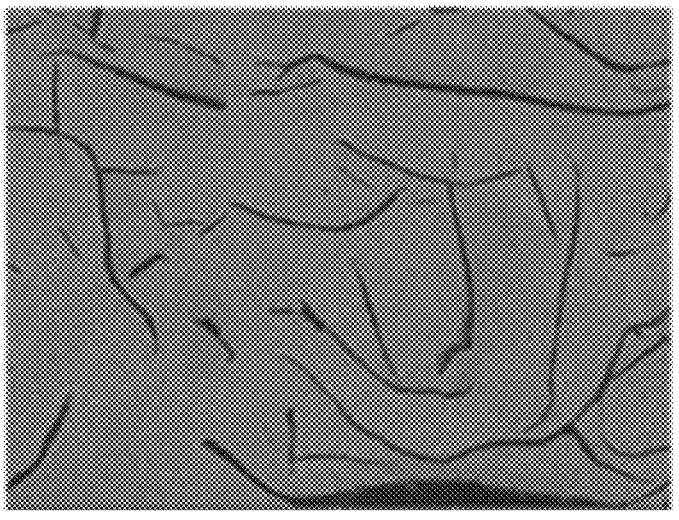
FIG. 2 is a SEM image of gray cast iron.
Figure 3:
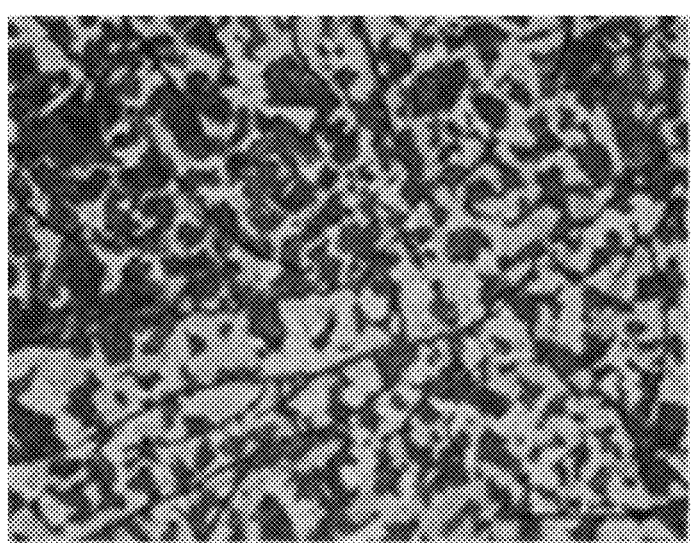
FIG. 3 is an SEM image of an alloy that has undergone a first step of a method of the present disclosure.
Figure 4:
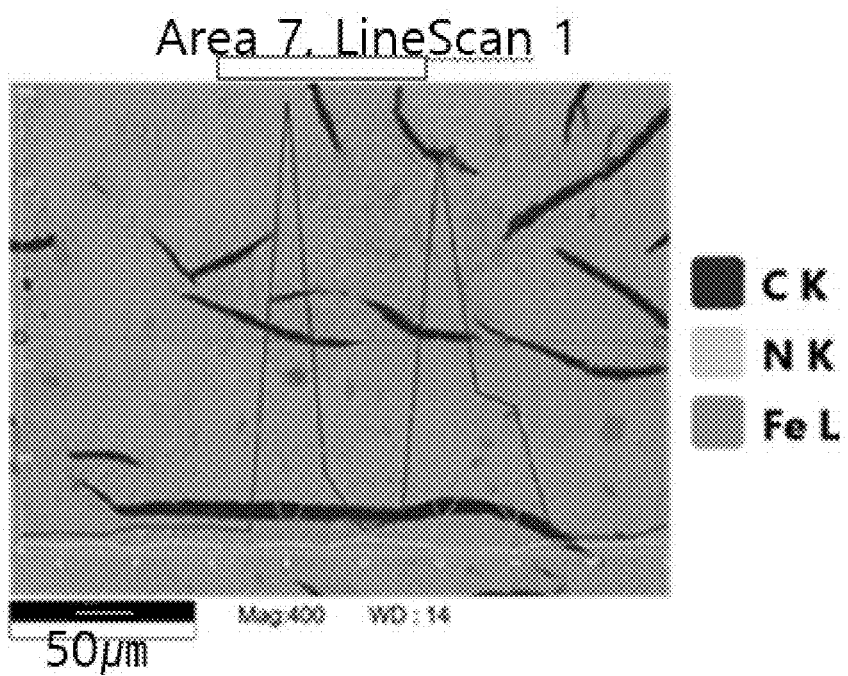
FIG. 4 is an SEM-EDS (line) image of a brake disc subjected to a third step of a method of the present disclosure.
Figure 5:
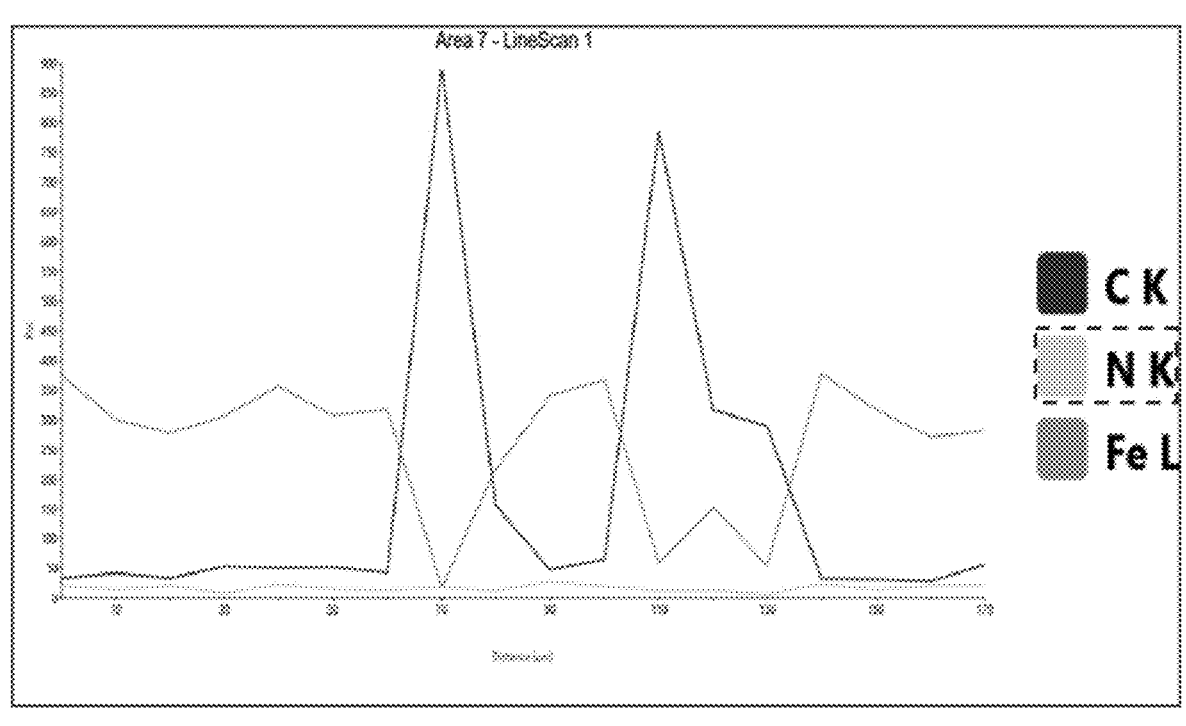
FIG. 5 is an EDS graph of a brake disc subjected to the third step of the method of the present disclosure.

FIG. 1 is a flowchart showing the manufacturing method of the lightweight brake disc with maximized heat dissipation ability according to the present disclosure. FIG. 2 is a SEM image of gray cast iron. FIG. 3 is an alloy that has undergone a first step of the method of the present disclosure. FIG. 4 is a SEM-EDS (line) image of a brake disc that has been subjected to a third step of the method of the present disclosure. FIG. 5 is an EDS graph of a brake disc that has been subjected to the third step of the method of the present disclosure.

Referring to FIG. 1, FIG. 2, FIG. 3, FIG. 4, and FIG. 5, the method may include a first step (S110) of mixing gray cast iron and Fe—Cr ferroalloy to produce a mixture, melting the mixture, and solidifying the mixture to cast an alloy, a second step (S120) of performing heat treatment of the alloy cast in the first step to pearlitize a microstructure of the alloy, and a third step (S130) of performing nitriding heat treatment on the alloy heat treated in the second step.

First, in the first step (S110), Fe—Cr ferroalloy may be added to gray cast iron. Referring to Table 1 below, the XRF of gray cast iron may be identified. The gray cast iron may be gray cast iron GC250, which contains about 3.5% of C (carbon) as the base material of the brake disc. Based on the SEM image of gray cast iron, it is identified that the carbon is present in a form of fine flake graphite in the base.

A composition of the Fe—Cr ferroalloy may be identified in Table 2 below. In order to obtain a target Cr content of 0.1% in a design alloy, a content of the Fe—Cr ferroalloy may be calculated and added by referring to the compositions of the gray cast iron and the Fe—Cr ferroalloy.

The calculated content of the Fe—Cr ferroalloy is added to the gray cast iron in a high-frequency induction furnace, and melting thereof may proceed in an inert atmosphere. A reaction temperature may be 1,500° C. or higher and a reaction time may be 30 minutes. Preferably, the reaction may be carried out for 30 minutes in an argon atmosphere at 1,600° C. After the melting process is completed, the melt is subjected to solidification such that the alloy may be cast.

TABLE 1

| Element | Wt % |
|---------|------|
| Fe | 92.99 |
| C | 3.53 |
| Si | 2.69 |
| Mn | 0.64 |
| S | 0.08 |
| P | 0.07 |

TABLE 2

| Element | wt % |
|---------|------|
| Cr | 60 min. |
| Si | 4 max |
| C | 0.1 max |
| S | 0.03 max |
| P | 0.04ax |

Thereafter, in the second step (S120), a process of modifying physical properties of the brake disc to which the Fe—Cr ferroalloy has been added via normalizing heat treatment may be performed. The normalizing heat treatment may be performed to control the microstructure of the cast specimen and remove internal stress. At this time, the reaction temperature may be 900° C. or higher, the reaction atmosphere may be an inert atmosphere, and the reaction time may be 8 hours. Preferably, the reaction may be carried out at 930° C. in an argon atmosphere and for 8 hours. Based on the SEM image, it is identified that the microstructure of the alloy is pearlitized after 8 hours of the heat treatment.

Finally, in the third step (S130), a process of modifying the physical properties of the brake disc via nitriding heat treatment may be performed. The nitriding heat treatment may be performed to improve the physical properties of the normalized heat-treated specimen. At this time, the reaction temperature may be 500° C. or higher, the reaction atmosphere may be an atmosphere in which $N_2$ (nitrogen), $NH_3$ (ammonia) and $CO_2$ (carbon dioxide) are mixed with each other, and the reaction time may be 8 hours or larger. Preferably, the reaction temperature may be at 560° C. and the reaction may be performed for 8 hours, and a flow rate of the reaction atmosphere may be $N_2$ 1.5 $m^3$/h, $NH_3$ 15 $m^3$/h, $CO_2$ 0.3 $m^3$/h.

It is identified based on the SEM image that a nitride layer is obtained after the nitriding heat treatment. As a result of SEM-EDS (line) analysis, it is identified that N (nitrogen) is detected on an entire surface of the specimen, and thus a surface of the specimen is nitrided.

After performing each of the steps in the manufacturing method of the present disclosure, tensile strength and surface strength are measured. The alloy subjected to the first step has a surface hardness of 231 HBW, a tensile strength of 219 MPa, and a yield strength of 182 MPa. The alloy subjected to the second step has 242 HBW of the surface hardness, the tensile strength of 267 MPA, and the yield strength of 211 MPA. It may be identified that all of the surface strength, the tensile strength and yield strength of the alloy subjected to the second step are improved, compared to those of the alloy subjected to the first step. The alloy subjected to the third step as the nitriding treatment has the surface hardness of 251 HBW and the tensile strength of 268 MPa. Thus, the surface hardness is increased by about 10 HMW and the tensile strength is increased by about 1 MPa, compared to those of the alloy subjected to the second step before the nitriding treatment.

The surface hardness and the tensile strength before and after the nitriding heat treatment on the heat-treated specimen may be identified in Table 3 below.

TABLE 3

| Before nitriding heat treatment | | After nitriding heat treatment | |
|---|---|---|---|
| Hardness | Tensile Strength | Hardness | Tensile Strength |
| 242 HBW | 267 MPa | 251 W | 268 a |

The surface strength and the tensile strength of the alloy manufactured by the manufacturing method of the present disclosure are analyzed. A commercially available brake disc from one advanced company has the surface hardness of 241 HBW and the tensile strength of 250 MPa. Thus, the surface strength and the tensile strength of the alloy manufactured by the manufacturing method of the present disclosure are improved by about 10 HBW and about 18 MPa compared to those of the commercially available brake disc from one advanced company. Thus, the brake disc manufactured by the manufacturing method of the present disclosure exhibits excellent tensile strength and surface hardness.

The brake disc manufacturing method of the present disclosure may realize not only the original technology but also the developed technology to secure a track record and lay the groundwork for entering domestic and foreign markets. In addition, the brake disc manufacturing method of the present disclosure may maximize the synergistic effect via modularization with the breaker caliper as the existing flagship product, and thus may lay the foundation for technology development in the field of high-performance brake discs and development of overall brake system products in the future. The promotion of modularized product sales of developed brake disc rotors and existing caliper products may improve the substitution effect of overseas imports and improve the foreign currency earning rate. A new business of high-ability brake discs may be created through domestic and foreign tuning companies and overseas OEMs. In addition, the present disclosure may contribute to the local economy by creating large-scale employment following the increase in sales of the developed brake disc rotor.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects.

What is claimed is:

1. A method for manufacturing a lightweight brake disc having maximized heat dissipation ability, the method comprising:

a first step of mixing gray cast iron and Fe—Cr ferroalloy with each other to produce a mixture, melting and solidifying the mixture to cast an alloy;

a second step of heat-treating the alloy cast in the first step to pearlitize a microstructure of the alloy, wherein the second step is performed:

at a reaction temperature of 900° C. or higher, under an inert atmosphere as a reaction atmosphere, and for a reaction time of 8 hours or larger; and a third step of performing nitriding heat treatment of the alloy heat-treated in the second step.

2. The method of claim 1, wherein the first step is performed:

at a reaction temperature of 1,500° C. or higher, under an inert atmosphere as a reaction atmosphere, and for a reaction time of 30 minutes or larger.

3. The method of claim 1, wherein the gray cast iron is composed of Fe (iron), C (carbon), Si (silicon), Mn (manganese), S (sulfur) and P (phosphorus).

4. The method of claim 1, wherein carbon is present in a form of fine flake graphite in a base material of the gray cast iron.

5. The method of claim 1, wherein in the Fe—Cr ferroalloy, a content of Cr is at least 60%.

6. A method for manufacturing a lightweight brake disc having maximized heat dissipation ability, the method comprising:

a first step of mixing gray cast iron and Fe—Cr ferroalloy with each other to produce a mixture, melting and solidifying the mixture to cast an alloy;

a second step of heat-treating the alloy cast in the first step to pearlitize a microstructure of the alloy; and a third step of performing nitriding heat treatment of the alloy heat-treated in the second step, wherein the third step is performed:

at a reaction temperature of 500° C. or higher, and for a reaction time of 8 hours or larger.

7. A method for manufacturing a lightweight brake disc having maximized heat dissipation ability, the method comprising:

a first step of mixing gray cast iron and Fe—Cr ferroalloy with each other to produce a mixture, melting and solidifying the mixture to cast an alloy;

a second step of heat-treating the alloy cast in the first step to pearlitize a microstructure of the alloy; and a third step of performing nitriding heat treatment of the alloy heat-treated in the second step, wherein the third step is performed under an atmosphere in which $N_2$ (nitrogen), $NH_3$ (ammonia) and $CO_2$ (carbon dioxide) are mixed with each other as a reaction atmosphere.

8. The method of claim 7, wherein a flow rate of the reaction atmosphere in the third step is controlled such that $N_2$ (nitrogen) is 1.5 $m^3/h$, $NH_3$ (ammonia) is 15 $m^3/h$, and $CO_2$ (carbon dioxide) is 0.3 $m^3/h$.

9. A lightweight brake disc having maximized heat dissipation ability, wherein the brake disc is manufactured by the method according to claim 1, wherein a tensile strength of the brake disc is in a range of 250 to 280 MPa, and a surface hardness of the brake disc is in a range of 240 to 260 HMW.

* * * * *